United States Patent
Chen et al.

(10) Patent No.: US 12,164,210 B2
(45) Date of Patent: Dec. 10, 2024

(54) HIGH FREQUENCY OPTICAL MODULATOR WITH LATERALLY DISPLACED CONDUCTION PLANE RELATIVE TO MODULATING ELECTRODES

(71) Applicant: NeoPhotonics Corporation, San Jose, CA (US)

(72) Inventors: Chengkun Chen, Kanata (CA); Maxime Poirier, Gatineau (CA); Raghuram Narayan, Newark, CA (US); Milind Gokhale, Palo Alto, CA (US); Marcel G. Boudreau, Ottawa (CA)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 18/097,598

(22) Filed: Jan. 17, 2023

(65) Prior Publication Data
US 2023/0152661 A1    May 18, 2023

Related U.S. Application Data

(60) Continuation of application No. 16/934,884, filed on Jul. 21, 2020, now Pat. No. 11,573,476, which is a
(Continued)

(51) Int. Cl.
*G02F 1/00* (2006.01)
*G02F 1/225* (2006.01)
(Continued)

(52) U.S. Cl.
CPC .......... *G02F 1/2255* (2013.01); *G02F 1/2257* (2013.01); *H01P 3/003* (2013.01); *G02F 1/212* (2021.01)

(58) Field of Classification Search
CPC ...... G02F 1/2255; G02F 1/2257; G02F 1/212; H01P 3/003
(Continued)

(56) References Cited

U.S. PATENT DOCUMENTS

| 5,129,017 A | 7/1992 | Kawano et al. |
| 6,522,793 B1 | 2/2003 | Silagyi et al. |

(Continued)

FOREIGN PATENT DOCUMENTS

| JP | H2-289821 A1 | 11/1990 |
| JP | H9-211402 A | 8/1997 |

(Continued)

OTHER PUBLICATIONS

Dummer et al., "Periodic Loading and Selective Undercut Etching for High-Impedance Traveling-Wave Electroabsorption Modulators," OFC/NFOEC, Optical Society of America (2008).
(Continued)

*Primary Examiner* — Kaveh C Kianni
(74) *Attorney, Agent, or Firm* — Harrity & Harrity, LLP

(57) ABSTRACT

Optical modulators are described having a Mach-Zehnder interferometer and a pair of RF electrodes interfaced with the Mach-Zehnder interferometer in which the Mach-Zehnder interferometer comprises optical waveguides formed from semiconductor material. The optical modulator also comprises a ground plane spaced away in a distinct plane from transmission line electrodes formed from the association of the pair of RF electrodes interfaced with the Mach-Zehnder interferometer. The ground plane can be associated with a submount in which an optical chip comprising the Mach-Zehnder interferometer and the pair of RF electrodes is mounted on the submount with the two semiconductor optical waveguides are oriented toward the submount. Methods for forming the modulators are described.

20 Claims, 6 Drawing Sheets

Related U.S. Application Data division of application No. 15/462,099, filed on Mar. 17, 2017, now Pat. No. 10,761,396.

(60) Provisional application No. 62/466,694, filed on Mar. 3, 2017.

(51) Int. Cl.
*H01P 3/00* (2006.01)
*G02F 1/21* (2006.01)

(58) Field of Classification Search
USPC ............... 385/1–9, 14, 15, 39–41, 129–132
See application file for complete search history.

(56) References Cited

U.S. PATENT DOCUMENTS

| | | | |
|---|---|---|---|
| 8,903,202 | B1 | 12/2014 | Prosyk et al. |
| 8,917,958 | B2 | 12/2014 | Prosyk |
| 9,069,223 | B2 | 6/2015 | Prosyk |
| 9,244,327 | B2 | 1/2016 | Prosyk |
| 9,280,004 | B2 | 3/2016 | Yagi et al. |
| 9,298,024 | B2 | 3/2016 | Yamanaka |
| 9,442,248 | B2 | 9/2016 | Yamazaki |
| 10,091,881 | B1* | 10/2018 | Kataoka ................. H01R 12/69 |
| 2003/0122263 | A1 | 7/2003 | Su |
| 2003/0223669 | A1 | 12/2003 | Enokihara et al. |
| 2004/0052491 | A1 | 3/2004 | Otake et al. |
| 2004/0133634 | A1 | 7/2004 | Chowdhury et al. |
| 2004/0202397 | A1* | 10/2004 | Hatta ................... G02F 1/0121 385/2 |
| 2004/0207896 | A1 | 10/2004 | Aoki et al. |
| 2005/0254743 | A1 | 11/2005 | Akiyama et al. |
| 2010/0111468 | A1* | 5/2010 | Funabashi .......... G02B 6/12004 385/14 |
| 2012/0195547 | A1 | 8/2012 | Rasras |
| 2014/0119686 | A1 | 5/2014 | Sugiyama |
| 2014/0205229 | A1 | 7/2014 | Thaniyavarn |
| 2014/0241659 | A1 | 8/2014 | Fukuda et al. |
| 2015/0078763 | A1 | 3/2015 | Sugiyama et al. |
| 2015/0117869 | A1 | 4/2015 | Wakayama et al. |
| 2016/0054639 | A1 | 2/2016 | Kono |
| 2018/0231866 | A1* | 8/2018 | Sugamata ............. G02F 1/2255 |

FOREIGN PATENT DOCUMENTS

| | | |
|---|---|---|
| JP | H10-48584 A | 2/1998 |
| JP | 2004-102160 A | 4/2004 |
| JP | 2005-91417 A | 4/2005 |
| JP | 2006-65085 A | 3/2006 |
| JP | 2009-204753 A | 9/2009 |
| JP | 2015-055840 A | 3/2015 |
| JP | 2015-088999 A | 5/2015 |
| TW | 2003-04006 A | 9/2003 |
| WO | 2016-152152 A1 | 9/2016 |

OTHER PUBLICATIONS

International Search Report and Written Opinion for co-pending international application No. PCT/US2018/019007 dated Jun. 5, 2018 (16 pages).
Search Report for corresponding European Patent Application No. 18 761 713.9 dated Nov. 18, 2020.
Office Action from corresponding Japanese Patent Application No. 2019-547629 dated Jul. 13, 2021.
Office Action from corresponding Taiwan Patent Application No. 107106827 dated Aug. 18, 2021.
Office Action from corresponding Japanese Patent Application No. 2019-547629 dated Mar. 8, 2022.
Office Action from corresponding Japanese Patent Application No. 2019-547629 dated Jul. 5, 2022.

* cited by examiner

HIGH FREQUENCY OPTICAL MODULATOR WITH LATERALLY DISPLACED CONDUCTION PLANE RELATIVE TO MODULATING ELECTRODES

CROSS REFERENCE TO RELATED APPLICATIONS

This application is a continuation of U.S. patent application Ser. No. 16/934,884 (now U.S. 2020/0348577), to Chen et al., filed Jul. 21, 2020, entitled "High Frequency Optical Modulator With Laterally Displaced Conduction Plane Relative to Modulating Electrodes," which is a divisional of U.S. patent application Ser. No. 15/462,099, (now U.S. 2018/0252982) to Chen et al., filed on Mar. 17, 2017, entitled "High Frequency Optical Modulator With Laterally Displaced Conduction Plane Relative to Modulating Electrodes," which claims priority to U.S. provisional patent application 62/466,694 to Chen et al. filed on Mar. 3, 3017, entitled "High Frequency Optical Modulator With Laterally Displaced Conduction Plane Relative to Modulated Electrodes," incorporated herein by reference.

FIELD OF THE INVENTION

The invention relates to optical modulators that can be useful in optical communications for various information transfer. The optical modulators can be useful for high bandwidth RF modulation delivered with an RF transmission line coupled with a semiconductor optical waveguide.

BACKGROUND OF THE INVENTION

Optical modulators incorporating Mach-Zehnder interferometer structures can be used to impose RF modulation on an optical signal, such as light from a laser source. The RF modulation can encode information within the optical signal for transport to remote locations through an optical communications network. The encoded information can include, for example, data signals, voice signals, video signals and/or other communication information.

The Mach-Zehnder interferometer structure splits the optical signal into two arms that interfere when recombined. The RF signal is superimposed onto the optical signal using the RF transmission line through alteration of the index of refraction of the optical waveguide by an electromagnetic RF signal. High fidelity transfer of the RF signal into modulation of the optical signal becomes more challenging as the frequency of the RF signal increases to accommodate higher bandwidth in the optical signal.

SUMMARY OF THE INVENTION

In a first aspect, the invention pertains to an optical modulator comprising a submount, electrical conduction pathways designed to carry RF signals, and an optical chip comprising a substrate and two semiconductor optical waveguides with electrical conductive elements along at least a portion of the optical waveguide surface. In some embodiment, the optical chip is attached to the submount with the optical chip substrate oriented away from the submount and the two semiconductor optical waveguides oriented toward the submount. The submount can comprise a conducting plane offset from the conductive RF electrodes of the optical chip. Generally, the optical chip further comprises two conductive RF electrodes adjacent respectively to corresponding optical waveguides and additional conductive elements connecting one of the conductive RF electrodes to the corresponding conductive element along a surface of the corresponding optical waveguide, and the electrical conduction pathways electrically connect to the conductive RF electrodes of the optical chip.

In a further aspect, the invention pertains to an optical modulator comprising a Mach-Zehnder interferometer and a pair of RF electrodes interfaced with the Mach-Zehnder interferometer, the Mach-Zehnder interferometer comprising an optical splitter connected to an optical input waveguide, two optical waveguide arms optically connected to the optical splitter and an optical combiner optically connected to the two optical waveguides and to an output waveguide. The optical waveguides can comprise a semiconductor optical material, and an electrical contact can be located on portions of the optical waveguide arms surface. Each RF electrode of the pair can comprise transmission line electrodes connected by additional electrodes to electrical contacts on respective optical waveguides. In some embodiments, a ground plane is spaced away in a distinct plane from the transmission line electrodes. The optical modulator can be used in a method for modulating an optical telecommunication signal, in which the method comprises exposing laser light split between the two optical waveguides of the Mach-Zehnder interferometer to separate RF electric fields transmitted along RF transmission lines; and recombining the light from the two optical waveguides to form a modulated optical signal. Furthermore, the method can further comprise embodiments of optical modulators with four Mach-Zehnder interferometers, delivering separate RF electric fields to each individual Mach-Zehnder interferometer; and multiplexing the optical signal by combining the resulting optical signal in orthogonal phase states and polarization states.

In another aspect, the invention pertains to a method of forming an optical modulator in which the method comprises bonding an inverted optical chip to a submount. The inverted optical chip can comprise a Mach-Zehnder interferometer with optical waveguides and two RF electrodes associated with distinct arms of the Mach-Zehnder interferometer. The submount can comprise electrical contacts aligned with electrical contact points along the adjacent surface of the waveguide structure. The submount can comprise a ground plane spaced away from the mounting surface of the submount.

DETAILED DESCRIPTION OF INVENTION

Figure 1:
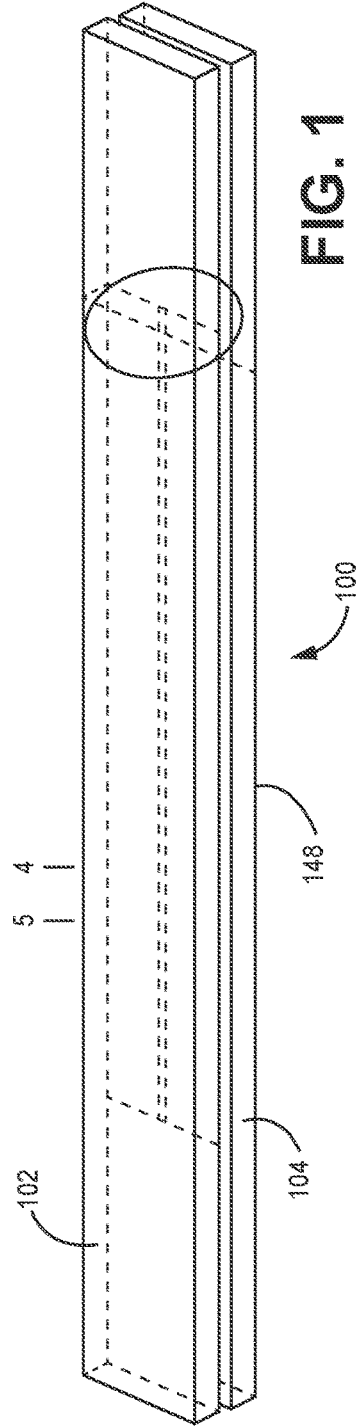
FIG. 1 is a schematic perspective view of an optical modulator of the present application with an optical chip interfaced with a submount.

An optical modulator can be formed with desirable high frequency performance using a mounting structure or submount with a conduction plane and an optical chip with optical waveguides for the arms of a Mach-Zehnder interferometer that can be positioned with RF electrodes on the optical waveguides. The conduction plane provides a convenient electrical ground plane to support the RF traveling wave that modulates an adjacent optical signal transmitted through the optical waveguides, generally semiconductor waveguides, but potentially other types of electro-optic waveguides. The resulting configuration effectively confines the electric field primarily within the structure providing for low cross talk with neighboring structures. Generally, the resulting mounted structure forms a RF transmission line. The direct mounting of the optical chip onto the submount provides for a convenient RF electrode configuration that introduces manufacturing efficiencies consistent with integration with associated optical components. Specifically, a ball or bump joining process can be used to form the electrical connections between aligned conduction elements such that heating flows a deposit of conductive metal, such as gold or silver, associated with one of the conductive elements to form the conductive bond with little or no manually-produced connections. The modulators described herein are designed to provide appropriate broadband signal modulation at RF frequencies extending to greater than 40 GHz, which are desirable for state of the art optical telecommunication systems as well as future anticipated systems. At high RF frequencies, the RF electrode configurations herein can be appropriately designed to provide for appropriate alignment of RF transmission speeds with the optical transmission through the semiconductor or other electro-optic waveguides.

Optical modulators can be used to introduce a modulation to a continuous wave optical transmission to encode the optical transmission with a desired data signal. To provide the modulation of the optical transmission, a radio frequency (RF) transmission line is placed in close proximity to an optical waveguide. The wavelength of the optical signal can be selected for incorporation into an optical telecommunication network, such as operating with C-Band from 1530 nm to 1565 nm or S-Band from 1460 nm to 1530 nm, or L-band from 1565 nm to 1620 nm.

The modulators described herein have a Mach-Zehnder interferometer (MZI) that comprises two optical couplers/splitters with two optical waveguides connecting the couplers/splitters that form arms of the MZI. The MZI arms each interface with electrodes of an RF transmitter. The electrodes generally are traveling-wave electrodes that consist of at least two electrodes that form a transmission line (one for each arm), for example, oriented approximately parallel to the optical waveguides. A series of electrode extensions or conductive elements connected to the transmission line electrodes are positioned more proximal to the optical waveguide. Specifically, these conductive elements directly adjacent to the optical waveguides are connected through bridge conductors to the transmission line electrodes. Electric fields from the transmission line electrodes and connected elements, as well as the ground, interact with the properties of optical waveguide material, and therefore the optical signals in the arms of the MZI. Generally, the two respective traveling RF electrodes are driven in an anti-phase (opposite voltages relative to ground) sense relative to each other. Due to the optical modulation, the interference of the optical signals when recombined from the MZI arms constructively or destructively interfere as a function of the modulation so that the transmitted optical signal from the MZI optical circuit is modulated based on the RF signals, and deconvolution of the modulated optical signal at a receiver can extract out the encoded information from the transmitted optical signal.

The speed of the optical signal through the waveguides depends on the index of refraction of the optical waveguide, which is generally a semiconductor or high-index dielectric. Similarly, the speed of the RF wave is dependent on the effective RF index of refraction for the RF transmission line electrodes in combination with a ground electrode and surrounding medium. Typically, the speed of the optical signal in the optical waveguide is noticeably different than the speed of the electrical signal in a simple corresponding transmission line. If the speeds of the optical signal and the electrical signal are sufficiently different from each other to result in a walk-off on the order of the modulation wavelength, such as on the order of a centimeter, the signal encoded by the modulation can be distorted, washed out, or lost. Adjusting the speed of optical propagation in the optical waveguide by an appreciable amount is generally impractical. Therefore, efforts have been made to design the structure of the RF transmission lines to better match the RF transmission speed to the optical propagation speed. As RF frequencies increase to allow for a higher bandwidth, the RF wavelengths shrink and the matching of the RF transmission to the optical propagation is correspondingly evaluated using tighter tolerances.

The design of the RF electrodes as well as a ground electrode influences the RF transmission. In particular, the electrode design influences power consumption, modulation efficiency and speed of RF transmission. At the same time that the RF transmission speed should appropriately match the optical propagation, it is desirable to have a low power consumption and low cross talk between other modulators mounted nearby while maintaining a desirable degree of signal modulation. An additional constraint is that the electrical impedance of the modulator should be matched to the output impedance of the RF source, including, but not limited to, an external generator or amplifier, or a co-packaged driver. The modulator designs described herein involve the location of the modulator on a submount, i.e. a mount structure that provides matching degree of freedom to match electrical impedance, also enabling high performance while providing suitable commercial processing. With the RF electrode facing toward the ground plane associated with the submount, the RF mode is confined in the submount without significant sensitivity to the airgap between the semiconductor chip and the submount.

With respect to the modulator structures herein, the mount provides a lateral displacement, i.e., non-coplanar relationship, between (a) the modulating electrodes placed on or adjacent the surface of the semiconductor based optical waveguide and connected to adjacent transmission lines and (b) a ground supported in a spaced away configuration laterally displaced from the plane of the modulating electrodes. The effective RF index of refraction seen by the RF signal depends on the structure. The optical waveguide structure is mounted in an inverted configuration relative to the supporting structure in the sense that the modulating electrodes are generally placed on "top" of the semiconductor optical waveguides relative to a substrate on which the optical waveguides are formed. Generally, the semiconductor optical waveguide is formed with a p-doped semiconductor layer adjacent the modulating RF electrodes, so the structure described herein can be referred to as a 'p-down' structure, although any reference to top or up or the like necessarily has some reference to a supposed orientation of the composite structure since any of the composite structures can be moved around in free space to reorient the structures. While the discussion herein focuses on current commercial processing approaches that are convenient for the structures described, the structures themselves can in principle be formed using direct build up of the desired structures as commercial processing evolves and may make such approaches competitive with the separate formation and mounting processes connecting an optical chip with a mounting structure.

In contrast, the use of coplanar grounding electrodes suitable for high frequency modulation are described in U.S. Pat. No. 8,917,958B2 to Prosyk (hereinafter the '958 patent), entitled "Electric Waveguide Transmission Device for Use With a Mach-Zehnder Optical Modulator," incorporated herein by reference. The '958 patent has a design intended to remove a ground electrode between the transmission line modulator electrodes while maintaining an effective optical modulator. Another RF optical modulator design with coplanar positioned ground conductors is presented in U.S. Pat. No. 9,069,223B2 to Prosyk (hereinafter the '223 patent), entitled "Mach-Zehnder Optical Modulator Using a Balanced Coplanar Strip Line With Lateral Ground Planes," incorporated herein by reference. The '223 patent asserts to achieve lower waveguide capacitance with reduced power consumption and reduced cross talk using "a balanced coplanar stripline with lateral ground planes." In contrast with these applications, the present modulators are augmented by coupling to a submount in an inverted configuration relative to the submount, and having a ground plane is positioned vertically displaced within the submount. In some embodiments, no lateral ground plane is present. The vertically displaced ground plane is distinct from a non-grounded, i.e., floating, semiconductor conduction plane linking the semiconductor optical waveguides, and a floating semiconductor conduction plane is generally inherent in the present system on the opposite side of the semiconductor optical waveguides away from the electrically conductive ground plane.

Figure 2:
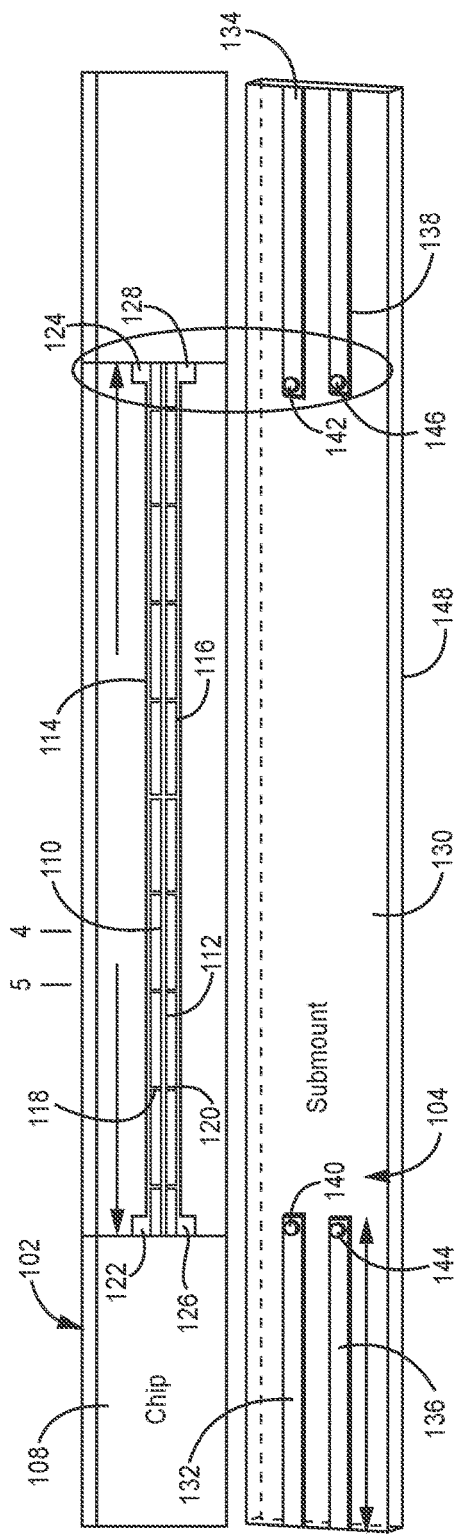
FIG. 2 is a schematic perspective view of optical chip and submount of FIG. 1 in which the optical chip is disconnected from the submount and inverted to show the surface of the optical chip that interfaces with the submount.
Figure 3:
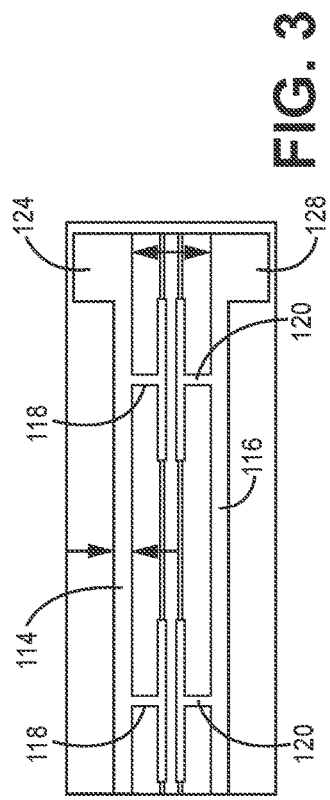
FIG. 3 is a fragmentary expanded view of a portion of the optical chip of FIG. 2.

An embodiment of the RF optical modulator as described herein is shown in FIG. 1. Referring to FIG. 1, an optical modulator structure 100 is shown with an optical chip 102 mounted on a submount 104. An exploded or separated view is shown in FIG. 2 with optical chip 102 rotated relative to submount 104 to show the mated structures. FIG. 3 shown an expanded view of a portion of optical chip 102. Referring to FIGS. 2 and 3, optical chip 102 has substrate 108, two optical waveguides 110, 112, two transmission line RF electrodes 114, 116 and respective bridge electrodes 118, 120. The transmission line RF electrodes can be, in some embodiments, from about 10 microns to about 30 microns wide, respective RF transmission line electrodes 114, 116 can be spaced apart from each other, in some embodiments, from about 50 microns to 150 microns apart. Respective transmission line RF electrodes 114, 116 terminate respectively with bond pads 122, 124 and 126, 128. Submount 104 comprises substrate 130, conduction stripes 132, 134, 136, 138 connected respectfully with bond pads 140, 142, 144, 146, and conductive plane 148. Substrate 130 can comprise a ceramic material, such as Aluminum Nitride, Alumina, or others; and/or a polymer material, such as polycarbonate or PET or the like. Electrically conductive elements of submount 104 can be formed with metal films, such as copper, silver, gold, alloys thereof or the like. Bond pads 140, 142 are configured for respective attachment to bond pads 122, 124, and bond pads 144, 146 are configured for respective attachment to bond pads 126, 128. Conductive plane 148 generally can be grounded to provide a ground for RF electrodes 114, 116. Collectively, RF electrodes 114, 116 and conductive plane 148 (ground) form a RF transmission line in which the electric and magnetic fields extends through the optical waveguides.

Figure 4:
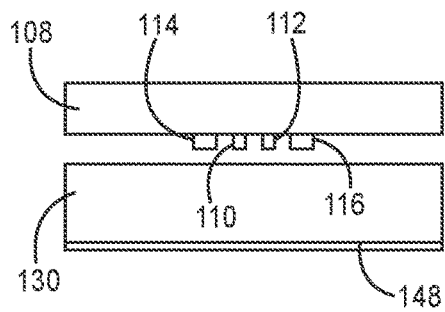
FIG. 4 is sectional side view of the modulator of FIGS. 1 and 2 taken at line 4.
Figure 5:
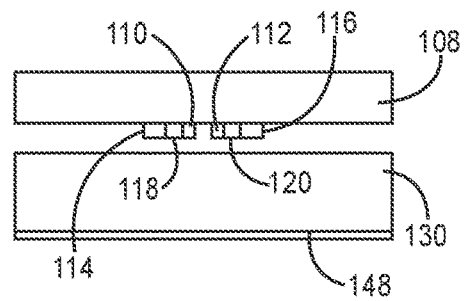
FIG. 5 is sectional side view of the modulator of FIGS. 1 and 2 taken at line 5 showing the bridge electrodes.
Figure 6:
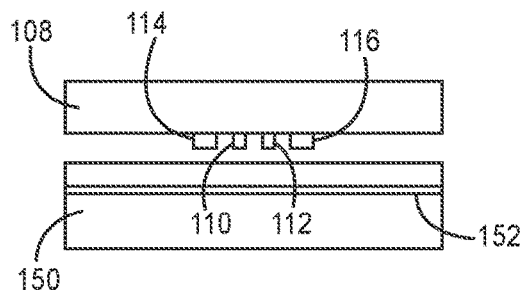
FIG. 6 is a sectional side view of a modulator along the same view as FIG. 4 with an alternative embodiment of the submount.
Figure 7:
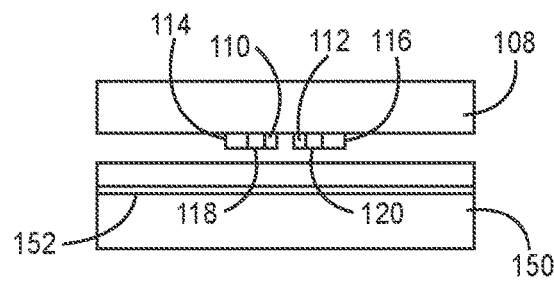
FIG. 7 is a sectional side view of a modulator along the same view as FIG. 5 with the alternative embodiment of the submount depicted in FIG. 6.

Sectional views of optical modulator 100 are shown in FIGS. 4 and 5. The cross section of FIG. 5 is positioned to show the bridge electrodes, which are not shown in FIG. 4. The figure shows the spatial relationship of transmission line RF electrodes 114, 116 with conductive plane 148 that functions as a ground plane. In general, the airgap between RF electrodes 114, 116 and the top of the submount can be on the order of 10 s of microns, and the thickness of the submount can be on the order of 100 microns. An alternative embodiment is shown in FIGS. 6 and 7. In this embodiment, substrate 150 of the submount comprises a conductive plane 152 within the substrate structure rather than on a surface, as shown in FIGS. 4 and 5. With such an alternative embodiment, the distance from the conductive plane to the transmission line can be designed to achieve desired RF performance without fixing the thickness of the submount. Also, the conductive plane can be on the top surface of the submount across an airgap from the RF transmission line, although it is generally desirable for the conductive plane to be a further distance from the RF line to provide for managed RF mode confinement and control of impedance in the RF line.

Figure 8:
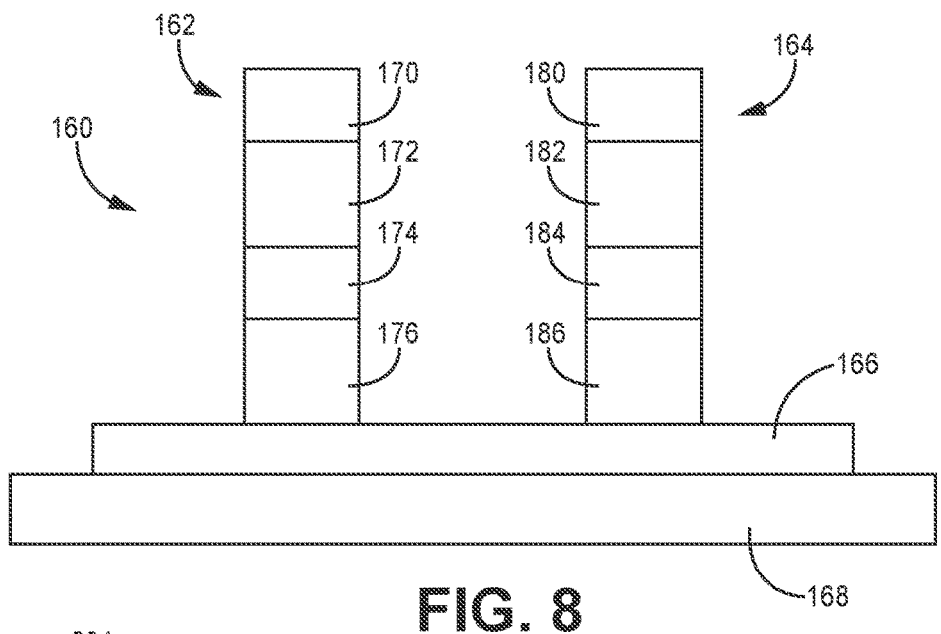
FIG. 8 is a sectional side view of pairs of representative semiconductor optical waveguides for a modulator of the present application on corresponding substrates with an electrical connection on the top surface of the optical waveguides.

Generally, for these MZI based optical modulators, the optical waveguides can be semiconductor based materials. A basic exemplified structure of a semiconductor optical waveguide is shown in FIG. 8, with both arms of the MZI depicted. Referring to FIG. 8, optical structure 160 comprises first optical waveguide 162, second optical waveguide 164, semiconductor support 166 and base support layer 168. First optical waveguide 162 and second optical waveguide 164 generally each comprise a p-i-n diode structure or more generally a c-n-c (conductive-nonconductive-conductive) structure, although additional layers and/or sublayers within the depicted layers can be included to provide desired performance. In the present context of semiconductor materials, as would be recognized by a person of ordinary skill in the art, a non-conductive material would not be absolutely non-conductive, but it would have a very significant electrical resistance, and conductive materials would not necessarily be as conductive as a metal, but in a relative sense the conductive materials would generally have a conductivity at least a factor of ten greater conductivity than the non-conductive regions and in many embodiments at least a factor of a hundred greater conductivity and in further embodiments at least a factor of 1000 greater conductivity. Specifically, in the depicted embodiments first optical waveguide 162 can comprise electrical contact 170 (connected to a bridge electrode), doped (such as p-doped) or conducting layer 172, intrinsic or non-conducting layer 174 and doped (such as n-doped) or conducting layer 176, and second optical waveguide 164 can comprise electrical contact 180, doped (such as p-doped) or conducting layer 182, intrinsic layer 184 and doped (such as n-doped) or conducting layer 186. First optical waveguide 162 and second optical waveguide 164 can be spaced sufficiently to reduce any optical interactions to a desired level, and a person of ordinary skill in the art can evaluate appropriate distances based on the material in the optical waveguides. Semiconductor support 166 generally can comprise a doped or conducting semiconductor layer, and base support layer 168 can comprise an intrinsic or non-conducting semiconductor layer. Electrical contacts 170, 180 generally comprise metal layers, such as silver, gold, platinum or copper, and as indicated in FIG. 3 and shown more explicitly in reference to FIGS. 9-11 below, the electrical contacts can only be associated with portions of the optical waveguides. For the other portions of the waveguide, the structure can be the same without the electrical contact layer. Suitable semiconductors or other optical-waveguide substrates include, for example, InP, GaAs, LiNbO$_3$, Si or other suitable material. Suitable dopants to generate conducting semiconductors generally include Si, S or P as an n dopant and Zn or B as a p dopant as well as other suitable dopant elements. A substrate can support the optical waveguide structure, such as a silicon support. Bulk support layer 168 can have a thickness of 10s to 100s of microns to provide a desirable level of support. The remaining layers are generally on the order of 50 nanometers (nm) to 5 microns. Also, there can be additional semiconductor layers or sublayers within a specific optical waveguide design. InP based modulators offer the possibility of a compact modulator format, but low impedance in conventional designs can limit the interaction lengths between electrical and optical waves. An approach to address these issues are described in Dummer et al., "Periodic Loading and Selective Undercut Etching for High-Impedance Traveling-Wave Electroabsorption Modulators," incorporated herein by reference. Because the position of the submount ground plane influences the impedance of the RF transmission line mode, the modulator designs herein offer an effective solution to these concerns with a convenient processing approach suitable for commercial manufacturing.

Figure 9:
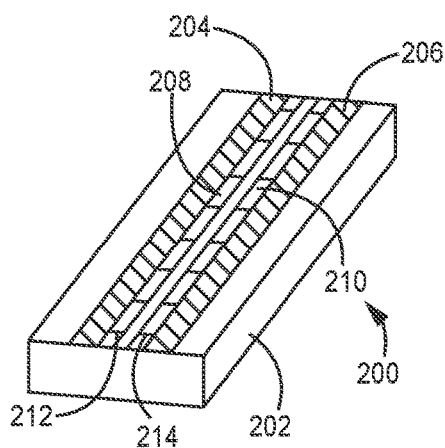
FIG. 9 is a fragmentary perspective view of an optical chip with optical waveguides interfaces with transmission line RF electrodes.
Figure 10:
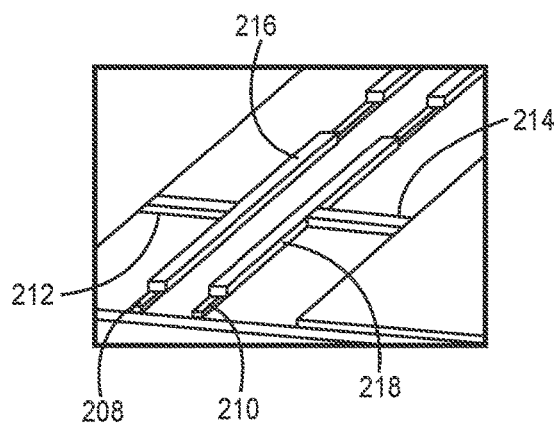
FIG. 10 is an expanded view of a portion of the structure in FIG. 9.
Figure 11:
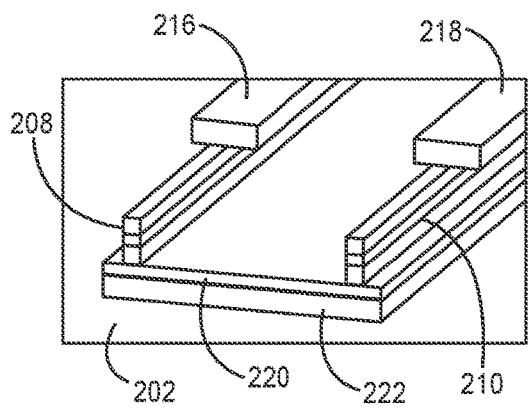
FIG. 11 is a further expanded view of a portion of the structure in FIG. 10 with a schematic view of electrical contacts interfaced with the optical waveguides.

Sequentially expanded views of a fragment of the optical chip 102 (sectional view in FIG. 4) are shown in FIGS. 9-11. In these views, the two arms of an MZI are shown with two corresponding transmission line RF electrodes with corresponding bridges to the electrical contacts located on the optical waveguides. Referring to FIG. 9, optical chip 200 comprises a substrate 202, RF electrodes 204, 206, optical waveguides 208, 210, and two sets of electrode bridges 212, 214, which are generally formed from appropriately patterned metal films. Referring to the further expanded view in FIG. 10, the connection of electrical bridges 212, 214 to electrical contacts 216, 218 associated with respective optical waveguides 208, 210. Electrical contacts 216, 218 cover selected portions of optical waveguides 208, 210. Electrical contacts correspond with electrical contacts 170, 180 in the structure of FIG. 8. Referring to the further expanded view of FIG. 11, a doped or conducting substrate 220 and base substrate 222 can be seen in association with optical waveguides 208, 210. Doped or conducting substrate 220 and base substrate 222 correspond respectively with semiconductor support 166 and bulk support layer 168 in the structure of FIG. 8.

Figure 12:
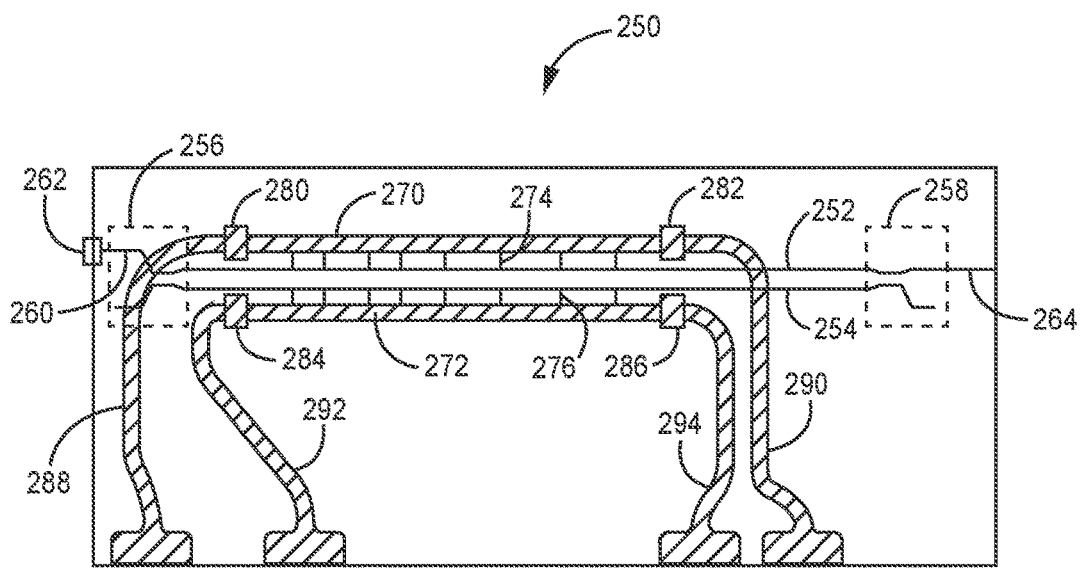
FIG. 12 is a schematic top view of a modulator of this application with the substrate of the optical chip invisible to show the interface between the optical chip and the submount.

The larger integration of the components of a modulator 250 are shown for an example embodiment in FIG. 12 with the optical chip substrate and any overlapping elements being transparent to show the interface of the optical chip with the submount in an assembled configuration. As a result of this depiction, the optical chip and submount are not readily distinguishable in this view, although they are distinguishable in other figures. Referring to FIG. 12, optical waveguides 252, 254 connect with couplers/splitters 256, 258 at their ends. An input waveguide 260 of optical coupler/splitter 256 is optically connected to an optical connector 262 at the edge of modulator 250 to provide for attachment to an optical fiber or an optical waveguide of another device, such as a laser structure. In some embodiments, input waveguide 260 of coupler/splitter 256 can interface with additional integrated optical elements on the optical chip as an alternative to directly interfacing with an optical connector. Optical coupler/splitter 258 interfaces with an output waveguide 264.

Transmission line RF electrodes 270, 272 connect respectively with optical waveguides 252, 254 through bridge electrodes 274, 276. Transmission line RF electrode 270 connects with conductive pads 280, 282, and conductive pads 280, 282 are in electrical contact with, respectively, conductive elements 288, 290 that terminate at conductive pads 280, 282. Transmission line RF electrode 272 connects with conductive pads 284, 286, and conductive pads 284, 286 are in electrical contact with, respectively, conductive elements 292, 294 that terminate at conductive pads 284, 286. Conductive elements 288, 290, 292, 294 are supported by the submount. Conductive pads 280, 282, 284, 286 connect electrodes along the optical waveguides on the optical chip with electrodes supported on the submount. The connection pads associated with conductive elements 288, 290, 292, 294 can be wired or otherwise electrically connected to the RF generator associated with providing the modulation signals and a suitable impedance matched RF termination network.

For use in present state of the art coherent optical communication, it can be desirable to group 4 MZI based modulator elements in association with each other, although smaller numbers of MZI based modulators such as one, two or three, can be integrated in a single optical chip for transmission of coherent or non-coherent communication signals based on further integrated structures. As used in the art, coherent refers to optical communication signals that carry information in both the amplitude and phase of the optical field and its polarization. For these signals, it is typical that two orthogonal polarization states of the optical signal are independently modulated, each according to the two degrees of optical phase and amplitude, and then recombined for transmission, which together can be referred to as polarization multiplexing (PM). Applying different schemes of electrical modulation to the embedded MZIs can generate various standard forms of coherent optical constellations to encode the data transmission. For instance, if the optical output for each polarization is at a constant amplitude and modulated to one of four optical phases separated by 90-degrees, this is conventionally referred to as "quadrature phase-shift keying" (QPSK). When used this way, the four-MZI configuration described provides "PM-QPSK" coherent optical transmission. This provides four binary 'bits' of information in each transmitted optical symbol (two polarizations times two bits—any of four possible phases—per polarization). Alternatively, it is possible to vary both the phase and amplitude of each transmitted polarization through modulation. This is conventionally called "nQAM" (n quadrature-amplitude modulation, where 'n' is the number of phase-amplitude states in the allowed palette). Typically desired modulation patterns include 16QAM (4 bits per polarization) and 64QAM (6 bits per polarization). The 4-MZI configuration group described herein is generally optimal for supporting transmission of any of the existing coherent transmission formats (e.g. PM-QPSK, PM-16QAM) or emerging formats (e.g. PM-64QAM, or other). Although not a widely-adopted terminology at the time of the present application, all these and other suitable coherent formats can be gathered under the readily-recognized term 'PM-IQ' (polarization multiplexed; in-phase/quadrature amplitudes). The 4-MZI embodiments described as example herein may therefore be referred to as PM-IQ modulators. Of course, larger groups of MZI based modulators can be packaged together, optionally in multiples of 4, to for instance to provide PM-IQ modulation of multiple independent optical wavelengths. To support a more specific discussion of packaging, for convenience, the immediately following discussion focuses on modulator structures with 4 MZI based modulator elements.

For assembly, the optical chip is formed using appropriate patterning and layer build up processing, such as CVD and photolithography. For the application of metal electrodes, sputtering, other chemical or physical vapor deposition approaches, conductive paste that can be cured for metal film formation, or the like can be used. The optical components can be formed, for example, on a smooth InP or silicon wafer and then diced to form the individual components. The metal electrodes are added along with the bridge electrodes and electrical contacts on the optical waveguide through bridge electrodes supported on appropriate support structure, as part of the RF transmission line and provide connection points to the submount. The submount can be a printed circuit board, flex-circuit, ceramic, metal layer stack or other similar structure that provides a desired structure with an insulating substrate and designed electrical connections. If a commercial printed circuit board, flex-circuit, ceramic or other appropriate structure has an appropriate thickness, a conductive layer can be placed along its surface distal to the optical chip as a ground plane. Alternatively a submount can be constructed with an appropriately elsewhere positioned conductive plane as a ground, such as within the submount, as described above, or along the proximal surface across an air gap from the optical chip. The optical chip can be inverted and placed onto the submount. The submount can comprise insulating support elements to support at least portions of the optical chip in a spaced away relationship from the surface of the submount. Support elements can be, for example, glass posts, ceramic columns, or the like. The electrical connections with the optical chip electrodes can be made by wire bonding, but in some embodiments appropriate assembly can be performed using mated bonding pads on the submount so that positioning of the optical chip with the submount aligns the bonding pads on each that can then be connected, such as with reflow of solder. In some embodiments, conductive metal bonding balls or pads can have appropriate dimensions to support the optical chip on the submount, which can then replace insulating posts or the like. Since wire bonding balls would be placed at suitable locations, there is no concern that they are conductive with no corresponding insulating structures between the elements. Other suitable processing approaches can be used.

Figure 13:
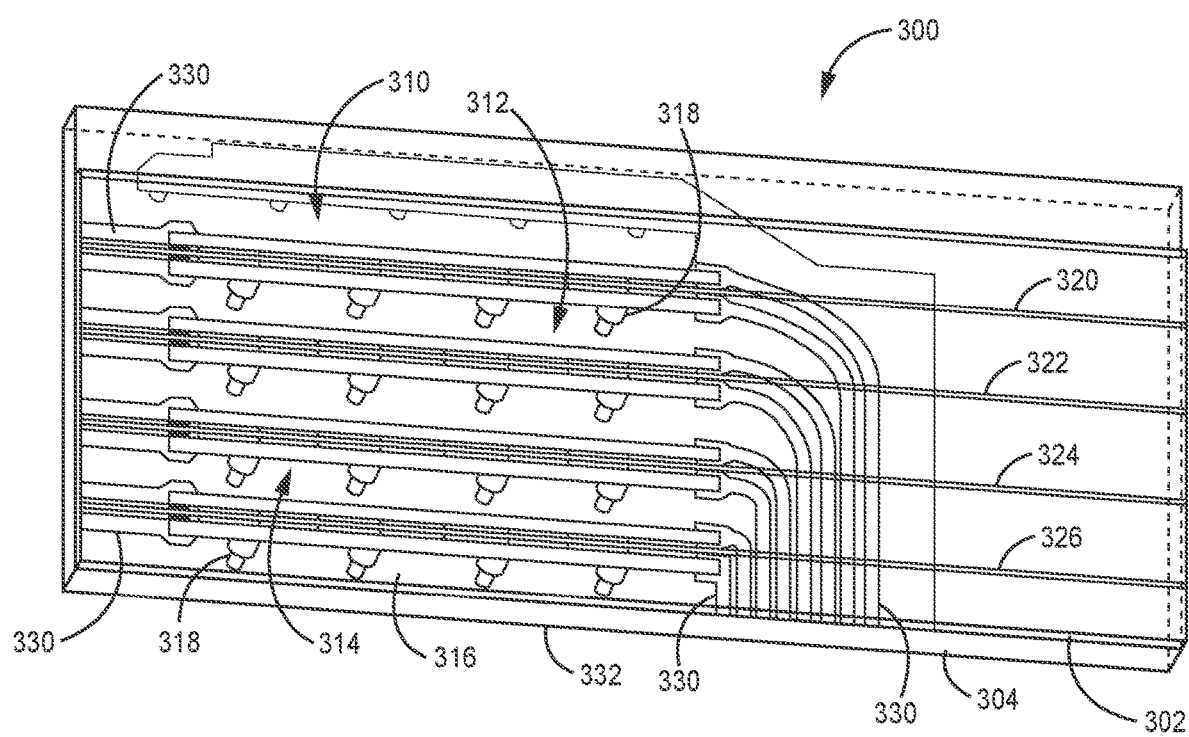
FIG. 13 is a fragmentary schematic view of an optical modulator having 4 Mach-Zehnder waveguides interfaced with RF microstrip transmitter.
Figure 14:
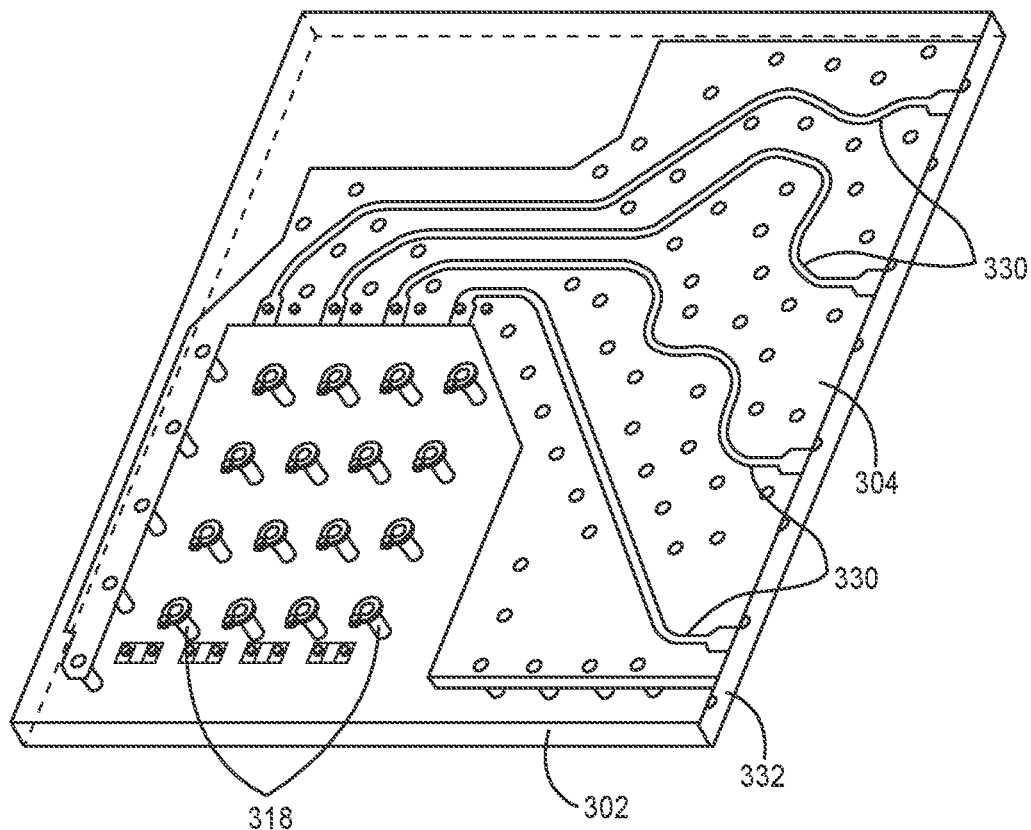
FIG. 14 is a schematic view of the optical modulator of FIG. 13 with a portion of the optical chip removed to show underlying structure.

Referring to FIG. 13, a fragmentary view of a modulator 300 is shown with an optical chip 302 supported on a submount 304. Optical chip 302 has 4 MZI structures 310, 312, 314, 316 mounted on the chip to modulate a coherent optical signal that results following the combining of the 4 separately modulated polarizations and amplitude-phase states from each MZI modulator component. Glass posts or wirebond balls 318 support optical chip 302 mounted on submount 304. As shown in FIG. 13, pairs of optical waveguides 320, 322, 324, 326 associated with each MZI structure 310, 312, 314, 316, respectively, pass through modulation zones between transmission line RF electrodes connected to electrical contacts on the optical waveguides and continue on both ends of the modulation zones. As suggested in FIG. 12, the two arms of each pair are directed on both ends to an optical combiner/splitter, and also then the four optical signals from the 4 MZI elements can be combined with an optical combiner to form a modulated output optical signal for transition. Each transmission line RF electrode is connected to a bond pad at or near each end, which electrically connects to electrodes 330 on submount 304. In this embodiment, a conduction plane 332 is shown located on the lower surface of submount 304, although locations within submount 304 can be equally effective. Submount 304 directly or indirectly provides electrical connection with an RF generator that provides desired modulation for data transmission. Referring to FIG. 14, an alternative view of modulator 300 is shown with portions of the optical chip removed.

Figure 15:
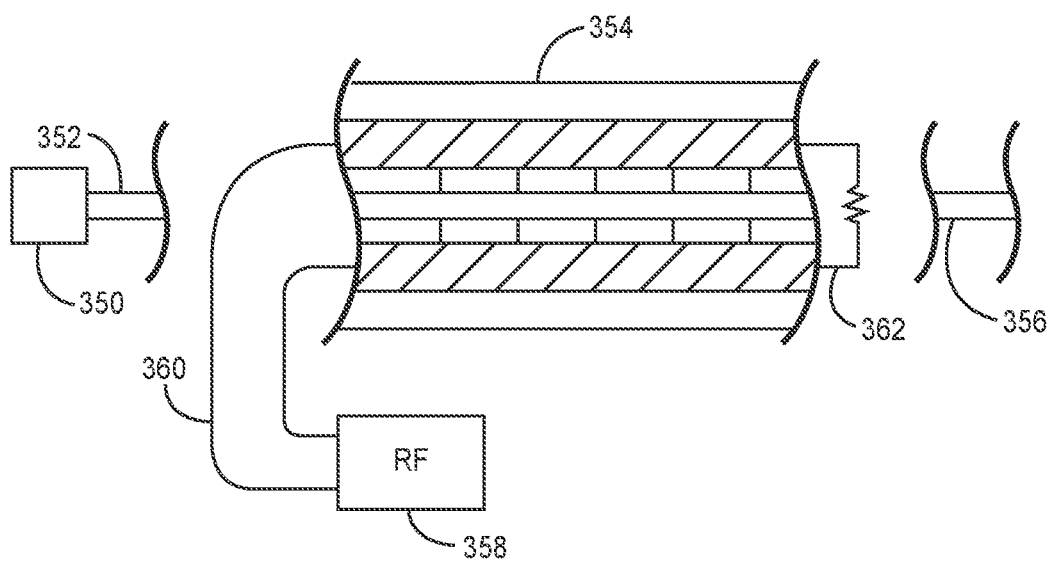
FIG. 15 is a schematic view of an optical modulator of the present application interfaced with other components of an optical transmitter.

A schematic layout of a modulator as described herein is shown in FIG. 15 as a portion of an optical telecommunications transmitter. A laser 350, such as a semiconductor diode laser or laser array, directs light output to a light channel 352, such as a waveguide or optical fiber, which interfaces with modulator 354. Through appropriate optical elements, modulator 354 ultimately interfaces with an optical fiber 356 that is part of an optical telecommunications network for transmission generally to a location remote from modulator 354. Modulator 354 generally is also electrically connected to an RF generator 358 through appropriate electrical connections 360 that have an electrical termination 362. Modulator 354 generally can have the various designs described herein to provide desirable modulator function. The connections of modulator 354 with the input and output components noted in FIG. 15 can use planar components, free space components or combinations thereof along with appropriate connectors, such as those known in the art to connect planar lightwave circuit to each other and/or optical fibers to planar lightwave circuits.

Figure 16:
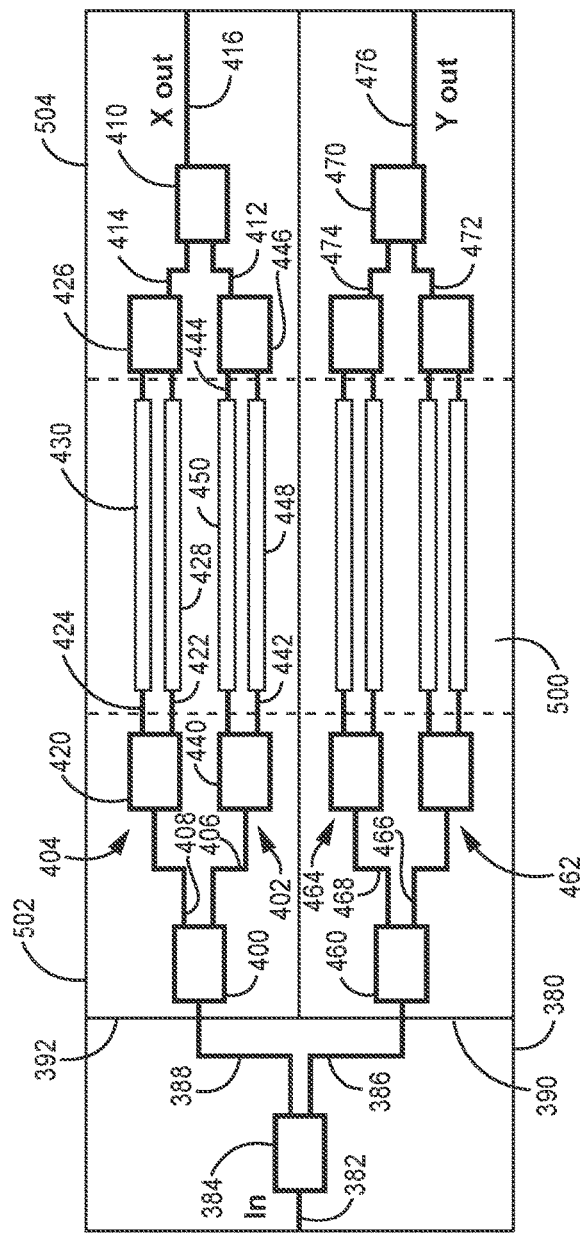
FIG. 16 is a schematic view of a dual polarization quadrature phase shift keying modulator.

Referring to FIG. 16, the layout is shown of a coherent optical chip 380 for a corresponding modulator. Coherent optical chip 380 comprises an input waveguide 382 connected to an optical splitter 384, which is connected by split waveguides 386, 388 to a first coupled pair of modulated Mach-Zehnder interferometers (MZI) 390 and a second coupled pair of modulated MZI 392. The coupled pairs of modulated Mach-Zehnder interferometers can be referred to as I-Q pairs based on terminology in the coherent optical telecommunications art. First coupled pair of modulated MZI 390 comprises optical splitter 400, first MZI 402, second MZI 404, input split waveguides 406, 408 connecting optical splitter 400 with first MZI 402 and second MZI 404, optical coupler 410, output split waveguides 412, 414 connecting optical coupler 410 with first MZI 402 and second MZI 404, and X output waveguide 416. First MZI 402 comprises optical splitter 420, first MZI arm 422, second MZI arm 424 and optical coupler 426. RF electrodes 428, 430 interface respectively with first MZI arm 422 and second MZI arm 424 with appropriate electrical connections as described herein. Similarly, second MZI 404 comprises optical splitter 440, first MZI arm 442, second MZI arm 444 and optical coupler 446. RF electrodes 448, 450 interface respectively with first MZI arm 442 and second MZI arm 444 with appropriate electrical connections as described herein. Second coupled pair of modulated MZI 392 comprises optical splitter 460, third MZI 462, fourth MZI 464, input split waveguides 466, 468 connecting optical splitter 460 with third MZI 462 and fourth MZI 464, optical coupler 470, output split waveguides 472, 474 connecting optical coupler 470 with third MZI 462 and fourth MZI 464, and Y output waveguide 476. Third MZI 462 and fourth MZI 464 comprise similar structure as first MZI 402 and second MZI 404 which is not labeled in the drawing to simplify the drawing. While optical chip 380 is described as a single planar optical structure, in some embodiments, the functions described for optical chip 380 can be divided in three or more planar optical structures 500, 502, 504 divided by the dashed lines in FIG. 16 that have suitable optical coupling connecting them. Optical structure 500 can be an optical chip with semiconductor waveguides forming the MZI while optical structures 502, 504 can be, for example, optical chips comprising silica glass waveguides forming splitters and combiners and associated optical components.

Figure 17:
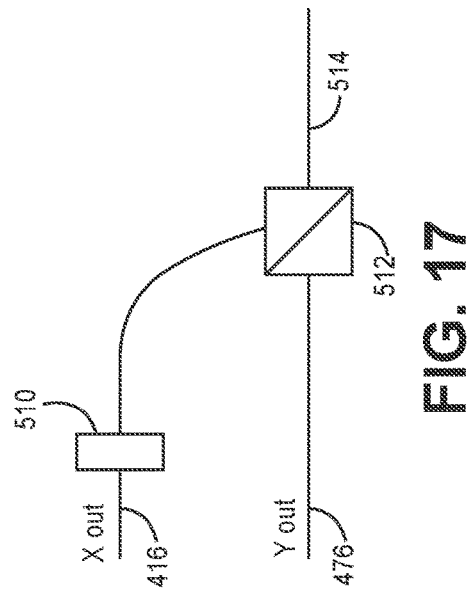
FIG. 17 is a schematic view of the coupling of the X output waveguide and the Y output waveguide of FIG. 16 passing through a polarizer and a polarization optical coupler.

To introduce the polarization dependence, a polarizer and polarization beam combiner can be used based on the X output signal and the Y output signal. Referring to FIG. 17, X output waveguide 416 interfaces with a 90 degree polarizer 510, such as a waveplate, that rotates the polarization for this signal. Polarized waveguide from polarizer 510 is directed to polarization beam combiner 512 that is also connected to Y output waveguide 476. Polarization beam combiner 512 directs output to polarization multiplexed output waveguide 514. The structure shown in FIG. 17 performs multiplexing of the optical signal by combining the resulting optical signal in orthogonal phase states and polarization states. Polarization beam combiners are described, for example, in U.S. Pat. No. 9,442,248 to Yamazaki, entitled "Polarization Beam Combiner/Splitter, Polarization Beam Combining/Splitting Structure, Light Mixer, Optical Modulator Module, and Method for Manufacturing Polarization Beam Combiner/Splitter," incorporated herein by reference.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understood that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. An optical modulator comprising:
a submount comprising a first substrate and a conducting plane positioned within the first substrate;
electrical conduction pathways designed to carry radio frequency (RF) signals; and
an optical chip comprising a second substrate, two conductive RF electrodes, and two semiconductor optical waveguides with electrical conductive elements along at least a portion of a surface of respective optical waveguides of the two semiconductor optical waveguides, wherein the two conductive RF electrodes are adjacent respectively to corresponding optical waveguides, and additional conductive elements connecting one of the conductive RF electrodes to a corresponding conductive element along a surface of a corresponding semiconductor waveguide,
wherein the optical chip is attached to the submount with the second substrate oriented away from the submount and the two semiconductor optical waveguides oriented toward the submount,
wherein a top surface of the conducting plane is vertically displaced from a top surface of the first substrate in a direction opposite the optical chip, and
wherein the electrical conduction pathways electrically connect to the conductive RF electrodes of the optical chip.

2. The optical modulator of claim 1, wherein the optical chip further comprises two optical couplers/splitters respectively connected to ends of the semiconductor optical waveguides.

3. The optical modulator of claim 2, wherein one optical coupler/splitter is optically connected to a laser light source and where the other optical coupler/splitter is optically connected to an optical fiber.

4. The optical modulator of claim 1, wherein the electrical conduction pathways are on the submount and wherein additional electrically conductive material forms electrical connections between the conductive RF electrodes and the electrical conduction pathways on the submount.

5. The optical modulator of claim 1, wherein the electrical conduction pathways are connected to an RF source.

6. The optical modulator of claim 1, further comprising insulating posts between locations on the optical chip and the submount that stabilize the optical modulator.

7. The optical modulator of claim 1, wherein an airgap separates the conductive RF electrodes and the submount along vertical axes that intersect each conductive RF electrode and are orthogonal to the top surface of the first substrate, and wherein the airgap is on the order of 10s of microns.

8. An optical modulator comprising:
a Mach-Zehnder interferometer comprising:
an optical splitter connected to an optical input waveguide,
two optical waveguide arms optically connected to the optical splitter, and
an optical combiner optically connected to the two optical waveguide arms and to an output waveguide, wherein the two optical waveguide arms comprise a semiconductor optical material;
a submount comprising a substrate, a ground plane positioned within the substrate and a pair of RF electrodes interfaced with the Mach-Zehnder interferometer, each radio frequency (RF) electrode of the pair of RF electrodes comprising transmission line electrodes connected by additional electrodes to electrical contacts on respective optical waveguide arms of the two optical waveguide arms; and
an electrical contact located on portions of a surface of an optical waveguide arm of the two optical waveguide arms,
wherein the ground plane is oriented relative to a plane with the pair of RF electrodes on an opposite side from the respective optical waveguide arms,
wherein a top surface of the ground plane is vertically displaced from a top surface of the substrate in a direction opposite the pair of RF electrodes, and
wherein the ground plane extends continuously with a planar extent under the pair of RF electrodes and an area between the pair of RF electrodes.

9. The optical modulator of claim 8, wherein the two optical waveguide arms each comprise an intrinsic or non-conducting semiconductor base layer, a first doped or conducting semiconductor layer above the base layer, a second intrinsic or non-conducting semiconductor stack layer above the first doped or conducting semiconductor layer relative to the base layer, and a second doped or conducting semiconductor layer above the second intrinsic or non-conducting semiconductor layer forming an n-c-n-c structure where n represents non-conducting and c represents conducting.

10. The optical modulator of claim 8, further comprising conductive wirebond balls, between locations on the Mach-Zehnder interferometer and the submount, that stabilize the optical modulator.

11. The optical modulator of claim 8, further comprising one additional Mach-Zehnder interferometer and one additional pair of RF electrodes associated with the additional Mach-Zehnder interferometer,
wherein the additional Mach-Zehnder interferometer comprises an additional optical splitter connected to an additional optical input waveguide, two additional optical waveguide arms optically connected to the additional optical splitter and an additional optical combiner optically connected to the two additional optical waveguide arms and to an additional output waveguide,
wherein the optical input waveguide and the additional optical input waveguide are connected through a splitter to a single optical input,
wherein the output waveguide and the additional output waveguide are connected by a combiner to a single optical output,
wherein the additional optical waveguide arms comprise a semiconductor optical material, an additional electrical contact is located on portions of a surface of the additional optical waveguide arms, and each additional RF electrode comprising additional transmission line electrodes connected by additional electrodes to additional electrical contacts on respective optical waveguides and the ground plane is spaced away in a distinct plane from the additional transmission line electrodes, and
wherein a resulting structure is termed a first I-Q pair of modulated Mach-Zehnder interferometers.

12. The optical modulator of claim 11, further comprising a second coupled I-Q pair of modulated Mach-Zehnder interferometers and an optical splitter that is configured to combine optical signals from the first I-Q pair of modulated Mach-Zehnder interferometers and the second coupled I-Q pair of modulated MachZehnder interferometers, where the output waveguide and the additional output waveguide are optically coupled by a polarization combining element to generate a polarization multiplexed signal.

13. A method for modulating an optical telecommunication signal using an optical modulator of claim 8, the method comprising:
exposing laser light split between the two optical waveguide arms of the Mach-Zehnder interferometer to separate RF electric fields transmitted along RF transmission lines; and
recombining light from the two optical waveguide arms to form a modulated optical signal.

14. A method for modulating an optical telecommunication signal using an optical modulator of claim 13, the method comprising:
delivering separate RF electric fields to the Mach-Zehnder interferometer; and
multiplexing the optical telecommunication signal by combining the modulated optical signal in orthogonal phase states and polarization states.

15. An optical modulator comprising:
a submount comprising:
a first substrate, and
a ground plane positioned within the first substrate; and
an optical chip comprising:
a second substrate,
two conductive radio frequency (RF) electrodes attached to the second substrate,
two semiconductor optical waveguides attached to the second substrate,
at least one conductive element along at least a portion of a surface of a waveguide of the two semiconductor optical waveguides,
wherein each RF electrode, of the two conductive RF electrodes, is adjacent to a corresponding waveguide of the two semiconductor optical waveguides, and
wherein a top surface of the ground plane is vertically displaced from a top surface of the first substrate in a direction opposite the optical chip, and
at least one conductive bridge element, each conductive bridge element of the at least one conductive bridge element connecting a corresponding conductive element, of the at least one conductive element, to one of the two conductive RF electrodes,
wherein the optical chip is attached to the submount with the second substrate oriented away from the submount and the two semiconductor optical waveguides oriented toward the submount.

16. The optical modulator of claim 15, further comprising:
a plurality of support elements, positioned between locations on the optical chip and the submount, that stabilize the optical modulator.

17. The optical modulator of claim 16, wherein the plurality of support elements define an air gap between the submount and the optical chip along vertical axes that intersect each of the two conductive RF electrodes and are orthogonal to the top surface of the first substrate.

18. The optical modulator of claim 15, wherein the two conductive RF electrodes and the ground plane form an RF transmission line in which electric and magnetic fields extend through the two semiconductor optical waveguides.

19. The optical modulator of claim 15, wherein the at least one conductive element is parallel to the portion of the surface of the waveguide.

20. The optical modulator of claim 19, wherein each conductive bridge element is arranged perpendicular to the at least one conductive element.

\* \* \* \* \*